United States Patent Office 3,098,731
Patented July 23, 1963

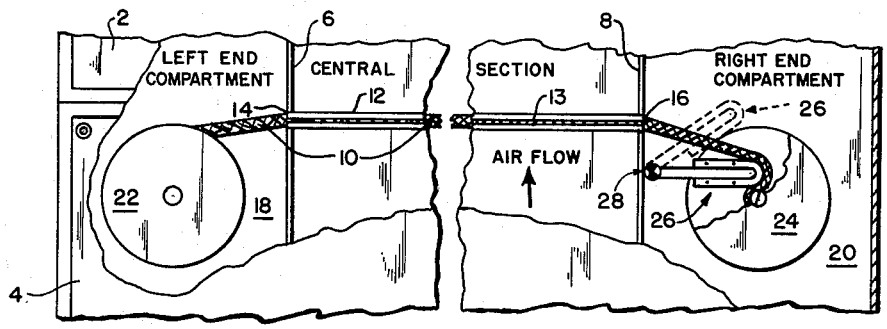
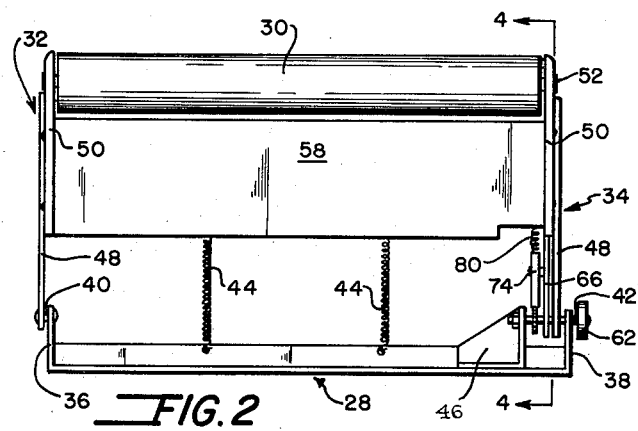 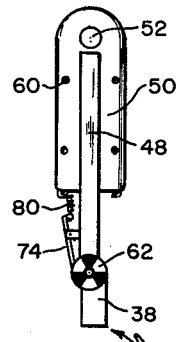
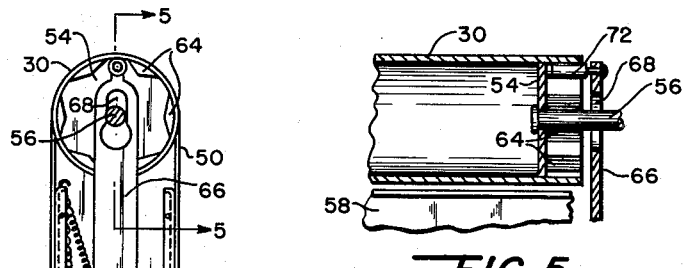
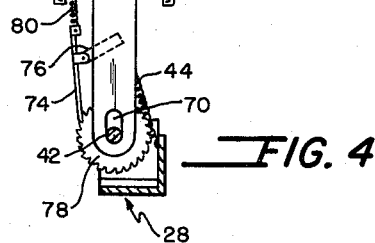

3,098,731
AIR FILTERING APPARATUS
Earnest J. Greene and William V. Millman, Moline, Ill., assignors to American Air Filter Company, Inc., Louisville, Ky., a corporation of Delaware
Filed Dec. 21, 1960, Ser. No. 77,317
5 Claims. (Cl. 55—274)

This invention relates generally to air filtering apparatus, and in particular to apparatus for measuring the advance of, and comprising, an air filtering medium passed out of an air flow zone and wound upon a rewind spool.

Air filtering apparatus of one type or another employing the filtering method described and claimed in Rivers' U.S. Patent 2,807,330 are currently being widely used in many commercial and industrial central ventilating air systems. In that method a length of expansible-compressible air filtering medium in compressed form in a supply zone is advanced therefrom into and through an air flow zone where the medium expands to its nominal uncompressed thickness and performs its filtering action, and is then advanced with its collected dirt load from the air flow zone into a discharge zone where it is compressed in thickness into a compact disposable package. Common commercial practice is to supply the compressed medium on a spool in the supply zone, and to wind used medium on a spool in the discharge zone.

Filtering apparatus utilizing this desirable mode of operation have not been applied, so far as we are aware, in connection with the relatively small heating, ventilating, and cooling units such as classroom unit ventilators and the like.

Currently unit ventilators and like devices employ unit or panel air filters of the type which, when dirty, have the medium or the filter as a whole replaced, or are cleaned and then recharged with an adhesive. This must be done periodically such as every one to three months depending upon the degree of dirtiness of the air passed through the unit ventilator. To gain access to the air filter for changing or servicing it, the sometimes cumbersome front panel thereof must be handled. While the entire operation is not difficult, it is time consuming and becomes tedious when multiplied by say, twenty to thirty, or more unit ventilators. Consequently, servicing of the air filters may be neglected with adverse effects upon unit ventilator operation. Thus it will be appreciated that the provision of an arrangement wherein the curtain of air filtering medium in the air stream can be renewed periodically from a compressed supply roll provided in one end of the unit ventilator, and the used filtering medium can be discarded in the form of a compact, readily disposable package after the entire length of filtering medium available from the supply roll has been used up, would be a desirable advance in this art.

However certain difficulties arise in attempting to adapt a so-called roll-type filter utilizing an expansible-compressible filtering medium for use in a unit ventilator. These difficulties stem in part from the relatively limited space available for such apparatus in a unit ventilator and in part from the requirement that the medium be handled in a particular manner to provide a satisfactory operation. In connection with the latter, the apparatus should be capable of winding and holding the used medium in relatively tightly compressed form on the rewind spool. Further, to facilitate the operation of renewing the curtain of filtering medium, it is desirable that this be able to be accomplished without requiring the removal of the front cabinet panels.

Thus the object of this invention is the provision of a roll-type filter apparatus for use in a unit ventilator or like device.

Another object of this invention is the provision of such apparatus which permits the renewal of the filter curtain without requiring removal of the cabinet front panels, and which includes means for indicating the extent to which the curtain has been renewed.

Another object is the provision of such apparatus incorporating means for compressing the used filtering medium as it is wound on a rewind spool.

The invention will be explained in some detail in connection with the accompanying drawing illustrating apparatus incorporating the principles of the invention in one embodiment by way of an example, and wherein:

FIGURE 1 is a broken elevational view of a portion of a unit ventilator or like device provided with a roll-type filter apparatus;

FIGURE 2 is an elevational view of the apparatus for measuring the extent of filtering medium advance and for compressing the filtering medium as it is wound on the rewind spool;

FIGURE 3 is an end view of the apparatus of FIGURE 2;

FIGURE 4 is a sectional view taken along the line 4—4 of FIGURE 2 with the end plate portion omitted for clarity;

FIGURE 5 is a fragmentary sectional view of one end of the apparatus taken along the lines 5—5 of FIGURE 4.

In the fragment of the unit ventilator somewhat diagrammatically shown in FIGURE 1 the upper and lower front panels 2 and 4 of the unit ventilator are, for the most part, broken away to expose the general interior arrangement of a unit ventilator. A central section of the unit ventilator, through which air flows in the direction indicated by the arrow, is defined at the sides by left partition 6 and right partition 8 and normally includes air dampers in the lower portion thereof, a heat exchanger and fans in the upper portion thereof, and an intermediate air filtering zone or space.

The air filtering zone, through which the air filtering medium 10 is advanced in accordance with the need for renewal, is generally defined: along the front and rear of the unit ventilator by inwardly directed channel-shaped members 12; on the top and bottom by suitable open work structures which support the filtering medium while in the air filtering zone against displacement in either direction; and at the ends by an entry aperture 14 in the left partition 6 and by an exit aperture 16 in the right hand partition 8. The front channel-shaped member 12 is formed of a pair of opposed angles spaced apart so that an elongate slot 13 extends across the width of the central section. This slot permits grasping a paper leader on each supply roll of medium so that the leader and a curtain of the filter medium may be advanced from the left end compartment to the right end compartment when a new roll of medium is installed.

The left and right end compartments 18 and 20 normally provide space for piping connections and automatic temperature control devices (neither of which are shown). In the illustrated unit ventilator a length of the air filtering material 12 of the general character described in the noted Rivers patent is provided in tightly wound compressed form on a spool 22 in the left end compartment 18 with the core ends of the spool being journalled in front and rear supports (not shown) to permit the withdrawal of the medium from the spool as needed. The supply spool 22 may be suitably supported by installing it within a box (not shown) which in turn is secured in position within the end compartment. In this case the box carries the bearings in which the spool ends are journalled and the box is open diagonally across one of its corners to permit the withdrawal of the medium. A rewind mandrel or spool 24 in the right end compartment also has its core ends journalled in bearings carried by a box like the one just described with the front end of the core being provided with a coupling element such as a slot or the like in the end thereof so that a crank shaft may be inserted through an aperture in the lower front panel 4 for engagement with the core end coupling. With the leading edge of the filtering medium 10 attached to the core of the rewind spool 24, it will be appreciated that by rotating the rewind spool in a counter-clockwise direction (as viewed in FIGURE 1), used filtering medium will be advanced from the exit aperture 16 and convolutely wound upon the rewind spool while a corresponding length of clean filtering medium will be withdrawn from the supply spool 22 and advanced into the air filtering zone.

In accordance with the invention a device generally designated 26 is mounted in the right end compartment 20 for measuring the extent of filter medium advanced and for flattening or compressing the medium as it is wound on the rewind spool. The device 26 in FIGURE 1 is illustrated in solid lines to show its one position corresponding to the rewind spool 24 having only one or two turns of the used air filtering medium wound thereon, and in dotted lines to show its opposite position corresponding to substantially the entire length of filtering medium being wound thereon.

The device 26 (FIGURE 2) is in the form of a generally rectangular frame having a base side 28 adapted to be secured to the right partition 8, an opposite longitudinal side in the form of a roller 30, and left and right end members 32 and 34 completing the frame. One end of the end members rotatably carries the roller 30 while the opposite ends are pivotally supported by the base side 28.

The base side 28 of the frame is an angle member having one leg thereof fixed to the partition. The opposite ends of this leg are bent to form right angle ends 36 and 38 for journaling the left and right frame-axles 40 and 42 which rotatably support the remainder of the frame structure. The other leg of the base side 28 has a pair of holes for securing one end of the compression springs which bias the frame toward the rewind spool core. A bracket 46 for supporting the left end of the right frame-axle 42 is also secured to the base side of the frame.

Each of the end members 32 and 34 of the frame includes a bar or strap portion 48 pivotally carried at one end by one of the frame axles, and a shield or plate portion 50 welded or otherwise suitably secured to the bar portions. Each plate 50 (FIGURE 3) has a semi-circular end with a concentrically disposed embossment 52 for receiving a projecting axle of the roller 30.

The roller side of the frame is in the form of a hollow cylinder, also designated 30, which has a disc 54 (FIGURE 5) inset slightly from each end of the roller to carry the projecting axles 56 journalled in the bearing embossments 52 of the end plates 50.

A rectangular plate or pan 58 with inwardly directed flanges along its four edges is secured to extend between the opposite end plates 50 parallel to and adjacent the roller 30 on each side of the device. In addition to stiffening the frame and shielding the interior of the device 26, the flat portion of these pans provides a surface over which the medium can be smoothly advanced. The pans are conveniently secured between the opposite end pans 50 by sheet metal screws 60 turned into the end flanges of the pans.

The advance of the filtering medium is measured and indicated by the device 26 by providing means indicating the extent of rotation of roller 30 as medium is advanced therearound in its passage to the rewind spool. A filter medium advance indicating disc 62 is attached to the outer end of the right frame-axle 42 for rotation therewith. As shown in FIGURE 3, the outer surface of this disc has markings applied thereto to divide it into segments. In accordance with the invention, rotation of the roller 30 causes proportional rotation of disc 62 through means now to be described.

Referring now to FIGURES 4 and 5, within the space defined between the right end of the roller 30 and the inset disc 54, a number of internal cam lobes 64 in the general form of triangular prisms are secured to the inner circumferential wall of the roller. Six lobes are shown in FIGURE 4. As the roller is rotated by the medium passing around a portion of its circumference, successive lobes move through a given position.

The rotary motion of the roller 30 is used to drive a link member 66, extending along the right end 34 of the frame, in a reciprocating motion. This reciprocating link 66 is mounted within the flanged end plate 50 and has a slotted opening 68 near its roller end for receiving the roller axle 56 and a slotted opening 70 near its opposite end for receiving the right frame-axle 42. The roller end of the link carries a cam follower 72 which projects into the right end space of the roller for engagement with the successive cam lobes 64 as the roller rotates. It will be appreciated that with this arrangement, the link 66 will move back and forth once for each cam lobe engaging and disengaging the follower 72.

To convert the reciprocating motion of the link 66 to rotary motion of the indicator disc 62, a pawl and ratchet arrangement is used. The pawl 74 is connected to reciprocating link 66 for reciprocating motion therewith by a strap 76 rigidly secured to the link 66. The pawl has a lug which is pivotally connected to the strap 76 so that the end of the pawl which engages the teeth of the ratchet 78 can be brought back into position to engage consecutive teeth as the ratchet is being rotated. A return spring 80 under tension is secured to the free end of the pawl 74 to insure that the reciprocating assembly will return each time after the ratchet has been rotated the circular pitch distance.

The device 26 is mounted as shown in FIGURE 1 with the base side angle 28 secured to the right vertical partition 8. The compression springs 44 bias the frame and roller in a clockwise direction (FIGURE 1), i.e., toward the rewind spool core. The device 26 is sized, with respect to its endwise dimension, so that the roller 30 extends in somewhat overlapping relation over the rewind spool core when only the first few turns of medium are on the spool. As the frame is progressively displaced in a counter-clockwise direction by the progressive build-up of successive layers of used medium on the spool, the line of tangency of the device relative to the roll of used medium progressively shifts toward the base side of the frame. However, irrespective of the amount of used medium on the rewind spool, a part of the roller 30 or a pan 58 will be in contact with the medium being wound on the spool, and will, through the force of the compression springs 44, compress the medium as it is wound on the spool.

It will also be appreciated from the description and drawing that the used medium being rewound on the spool must first pass around nearly half of the circumference of the roller 30. The substantial surface contact area of used medium to roller, coupled with the rewinding pull causing the used medium to press more tightly against the surface of the roller, tends to insure against slippage of the medium relative to the roller 30 surface.

The installation of the filter medium in a unit ventilator equipped with the invention will now be briefly described, followed by a description of a normal operational sequence as the medium gets dirty. A roll of compressed filter material on supply spool 22 is mounted in the one end compartment and the paper leader is successively threaded through the entry aperture 14, air filtering zone (access to the leader being had through the slot 13), out the exit aperture 16, looped over and around the frame roller, and is then affixed to the rewind spool core. The rewind spool is then cranked in a counter-clockwise direction until a supply of filter medium extends across the central section.

After the unit ventilator has been operated for a sufficiently long period that the filter medium in the air flow zone should be renewed because of resistance to air flow, a crank is inserted through a hole in the lower front panel 4, coupled with the front end of the rewind spool core, and rotated counter-clockwise. This causes used filter medium to be progressively advanced out of the central section, around the roller 30 and onto the rewind spool 24. The passage of medium around the roller causes it to rotate with a circumferential displacement corresponding to the lineal displacement of filter medium advanced. This rotation of the roller is transmitted to a proportional rotation of the indicator disc 62 by the previously described cams, reciprocating link, pawl and ratchet assembly.

With a given number of ratchet teeth and a given diameter roller, the extent of the rotation of the indicator disc for a given advance of medium may be varied for different size unit ventilators by varying the number of cam lobes. For example, if a complete change of the medium in the central section of a given size unit ventilator and one revolution of ratchet and indicator disc occurs with six cam lobes as shown, for a unit ventilator having twice the central section length three cam lobes will give one revolution of ratchet and disc with a complete change of medium.

It is believed preferable that a complete change of medium in the center section be effected whenever the resistance of the medium increases above a predetermined level. However, if desired any part of the curtain may be renewed by cranking the rewind spool until the indicator has made only a part of a revolution. Thus, if it is decided that only half the curtain be renewed at a time, the crank is turned until the indicator has made only half a revolution.

The need for renewing all or a part of the filter curtain is determined by resistance to air flow exerted by the filter curtain. When the resistance rises above a predetermined value, this is indicated by actuation of a filter resistance gauge mounted on the unit ventilator. This same filter gauge will indicate when the end of a roll of medium is reached by providing a paper trailer at the end of the roll to block air flow as it is advanced across the central section.

The invention claimed is:

1. In an air conditioning unit of the type having a central section through which air to be conditioned is passed, and oppositely disposed end compartments separated from said central zone by opposite partitions: means forming an air filtering zone extending transversely across said central section and defining a passage for an air filtering medium adapted to be advanced thereinto through an entry aperture in one of said partitions, and out of an exit aperture in the other of said partitions; a supply of air filter medium of a length adapted to provide a plurality of complete filter changes mounted in said end compartment adjacent said entry aperture; a rotatable mandrel in said opposite end compartment adapted to be rotated for effecting the advance of filter medium through said passage and out of said exit aperture by winding said medium thereon; means in said opposite end compartment for compressing said used medium as it is wound on said mandrel including rotatable roller means disposed to displace said medium sufficiently out of a direct line of travel between said exit aperture and said mandrel that said medium must loop around and then under said roller means to be wound on said mandrel; means mounting said compressing means to urge it toward said mandrel but permitting progressive arcual displacement away from said mandrel as said used medium is progressively wound thereon; means for indicating the extent of said medium advanced around said roller means including a rotatable indicator; and means connecting said roller means and said indicator for effecting rotation of said indicator proportionally to the rotation of said roller means.

2. In a unit ventilator having a roll-type filter utilizing an expansible-compressible filtering medium adapted to be periodically advanced out of an air flow zone and onto a rewind spool, apparatus for compressing and measuring said medium as it is wound on said spool, comprising: medium compressing means including a rotatable roller interposed between the exit of said air flow zone and said rewind spool to sufficiently displace used medium out of a direct line path therebetween that said medium loops around a substantial portion of said roller circumference and then between said compressing means and said spool; a frame carrying said compressing means; axle means for mounting said frame to permit progressive arcual displacement of said compressing means away from said spool as said medium is progressively wound thereon; spring means biasing said frame in a direction to urge said compressing means toward said spool; a rotatable indicator; and means connecting said roller and said indicator for rotating said indicator to a degree proportional to the degree of rotation of said roller effected by the advance of said medium therearound.

3. Apparatus as specified in claim 2 wherein: said roller includes a hollow end having a series of camming elements spaced around the internal circumference thereof; a reciprocating link, having a follower at one end projecting into said roller end for engagement with said elements, extends along one end of said frame, the opposite end of said link having a slot therein encompassing said axle means to permit reciprocation of said link relative to said axle means as said follower engages and disengages said camming elements; said link has a pawl connected thereto for reciprocation therewith; a ratchet coupled to said indicator for simultaneous rotation therewith is disposed for engagement by said pawl as said link is reciprocated.

4. Apparatus for registering the advance of, and compressing in thickness, used air filtering medium adapted to be progressively advanced out of an exit aperture of an air filtering zone and onto a rotatable rewind mandrel, comprising: means for compressing said used filtering medium as it is wound on said mandrel including roller means disposed to so displace said medium out of a straight line path of travel between said exit aperture and said mandrel that said medium loops around said roller means and then passes between said compressing means and said mandrel as it is being wound upon said mandrel; frame means mounting said roller means to permit progressive arcual displacement thereof about a fixed pivot point and away from said mandrel as said medium is correspondingly progressively wound on said mandrel; means for biasing said compressing means toward said mandrel; filter medium advance indicating means including a rotatable element coaxially mounted relative to said pivot point; and means connecting said indicating means and said roller means for effecting rotation of said indicating means to a degree proportional to the degree of rotation of said roller means whereby the extent of advance of said medium passing around said roller means is indicated as it is being wound on said mandrel.

5. Apparatus for registering the advance of, and compressing in thickness, used air filtering medium adapted to be progressively advanced out of an exit aperture of an air filtering zone and onto a rotatable rewind mandrel, comprising: means for flattening said used filtering medium as it is wound on said mandrel including roller means extending across substantially the width of said medium and disposed to so displace said medium out of a direct line of travel from said exit aperture to said mandrel that said medium loops around a substantial portion of said roller means circumference and then passes between said flattening means and said mandrel as it is being wound thereon; pivotally mounted frame means including axle means mounting said flattening means to permit progressive displacement thereof away from said mandrel as said medium is correspondingly progressively wound thereon; means biasing said flattening means toward said mandrel;

filter medium advance indicating means including a rotatable element coaxially mounted relative to said axle means; and means connecting said roller means and said indicating means for rotating said indicating means to a degree proportional to the lineal advance of said medium passing around said roller means.

References Cited in the file of this patent

UNITED STATES PATENTS

| | | |
|---|---|---|
| 1,327,420 | Brogden | Jan. 6, 1920 |
| 2,700,544 | Chambon | Jan. 25, 1955 |
| 2,881,861 | Dyer | Apr. 14, 1959 |